(12) United States Patent
Jacquelot

(10) Patent No.: US 11,278,156 B2
(45) Date of Patent: Mar. 22, 2022

(54) DEVICE FOR BREAKING THE SHELLS OF NUTS

(71) Applicant: Bertrand Jacquelot, Vaulx le Penil (FR)

(72) Inventor: Bertrand Jacquelot, Vaulx le Penil (FR)

(*) Notice: Subject to any disclaimer, the term of this patent is extended or adjusted under 35 U.S.C. 154(b) by 0 days.

(21) Appl. No.: 16/909,498

(22) Filed: Jun. 23, 2020

(65) Prior Publication Data

US 2020/0405099 A1    Dec. 31, 2020

(30) Foreign Application Priority Data

Jun. 25, 2019   (FR) ...................................... 1906919

(51) Int. Cl.
*A47J 43/26*        (2006.01)

(52) U.S. Cl.
CPC ..................... *A47J 43/26* (2013.01)

(58) Field of Classification Search
CPC .......... A47J 43/26; Y10T 403/32557
See application file for complete search history.

(56) References Cited

U.S. PATENT DOCUMENTS

| 4,009,651 | A |   | 3/1977 | Adams |  |
|---|---|---|---|---|---|
| 4,200,042 | A | * | 4/1980 | Scholz | A47J 43/26 30/120.3 |
| 4,554,736 | A | * | 11/1985 | Rodriguez | A47J 43/26 30/120.3 |

FOREIGN PATENT DOCUMENTS

| EP | 3238585 A1 | 11/2017 |
|---|---|---|
| FR | 2896979 A1 | 8/2007 |

OTHER PUBLICATIONS

FR Search Report, dated Feb. 24, 2020, from corresponding FR application No. 1906919.
Adrien Roussel: "Le casse-noisette TOHA", YouTube, Feb. 24, 2014 (cited inFrench Search Report) Screenshots provided.

* cited by examiner

*Primary Examiner* — Stephen Choi

(74) *Attorney, Agent, or Firm* — Nixon & Vanderhye

(57) ABSTRACT

A device for breaking the shells of nuts, such as walnuts, pecan nuts, cashew nuts, almonds, macadamia nuts, hazelnuts, where such device includes a sleeve with a through hole along an axis, elastic gripping means which can exert a force in a preferential direction coupled to the end of the sleeve in a manner such that the preferential direction is substantially coincident with the axis of a base, and a means for rotatably mounting the sleeve with respect to the base about an axis which is perpendicular to the axis, in a manner such that the sleeve is capable of taking up a first position in which the plane of the second end of the sleeve rests substantially on the face of the base and a second position in which the plane of the end of the sleeve makes a non-zero angle with the plane of the face of the base.

9 Claims, 2 Drawing Sheets

DEVICE FOR BREAKING THE SHELLS OF NUTS

TECHNICAL FIELD

The present invention relates to devices for breaking the shells of nuts such as walnuts, pecan nuts, pistachios, cashew nuts, almonds, macadamia nuts, hazelnuts, etc.

A device for breaking the shells of nuts is already known. This device is essentially constituted by two independent parts but which, in order to allow the device to function correctly, have to cooperate by assembling them, which is carried out manually. These two parts are: a first part constituted by a sleeve one end of which is closed off by an elastic hood, and a second part constituted by a base the dimensions of which are suitable for closing off the second end of the sleeve.

This prior art device functions as follows. If, for example, a user wishes to break the shell of a hazelnut, then firstly, he positions the sleeve in a manner such that, in a medium in which a gravitational force prevails, its second end is at a level which is higher than its first end, then introduces the hazelnut into the sleeve via its second end. In this manner, the hazelnut falls into the bottom of the hood.

Using two fingers, for example, he grasps the hazelnut by squeezing it with the bottom of the hood, then exerts a pulling force on this hood in order to extend it and thus to tense it elastically in the manner of a spring.

Having carried out these manipulations, while keeping the hood tensed and keeping hold of the hazelnut, he assembles the two parts in a manner such that the second end of the sleeve is closed off by the base. When the two parts have been assembled in this manner, he releases the hood which, in the manner of a catapult or a sling, violently projects the hazelnut onto the base, which has the effect of 30 smashing the shell of the hazelnut.

The user can then take the two parts apart. The face of the base which was turned towards the interior of the sleeve acts as a serving plate for the hazelnut, freed from its shattered shell. The user can then remove the hazelnut to eat it, and can discard the smashed shell.

A device in accordance with the prior art has, for example, been described in a number of documents, for example the "TOHA nutcracker" advertisements from Mr. Adrien Roussel which can be seen on the internet, EP 3238585, U.S. Pat. No. 4,009,651 and FR 2896979.

A device in accordance with the prior art is entirely satisfactory as regards carrying out its intended task. However, it can suffer from a major disadvantage as regards safety considerations. In fact, an inept or careless individual could use the first part alone as described above exactly in the manner of a catapult without attaching it to the base, giving rise to the possibility that objects in the environment could be broken and/or other people in the vicinity could be injured.

Aim of the Present Invention

Thus, the aim of the present invention is to produce a device which is simple and inexpensive to produce in order to break the shells of nuts and which overcomes the major disadvantage mentioned above of the prior art device described above.

Definition of the Invention

More precisely, the present invention concerns a device for breaking the shells of nuts as defined in the accompanying claim 1.

BRIEF DESCRIPTION OF THE DRAWINGS

Other characteristics and advantages of the present invention will become apparent from the following description, given with reference to the accompanying drawings provided by way of non-limiting illustration, in which.

It should be noted that in the present description, when the adverb "substantially" is associated with a qualification for a given means, this qualification should be interpreted in its narrow or approximate sense.

DESCRIPTION OF A PREFERRED EMBODIMENT OF THE SUBJECT MATTER OF THE INVENTION

The present invention concerns a device for breaking the shells of nuts Fc, for example walnuts, pecan nuts, pistachios, cashew nuts, almonds, macadamia nuts, hazelnuts, etc. By way of example in the present description, the hazelnut has been selected as the nut Fc, but the use of the device in accordance with the invention is not limited to this type of nut.

Figure 1:
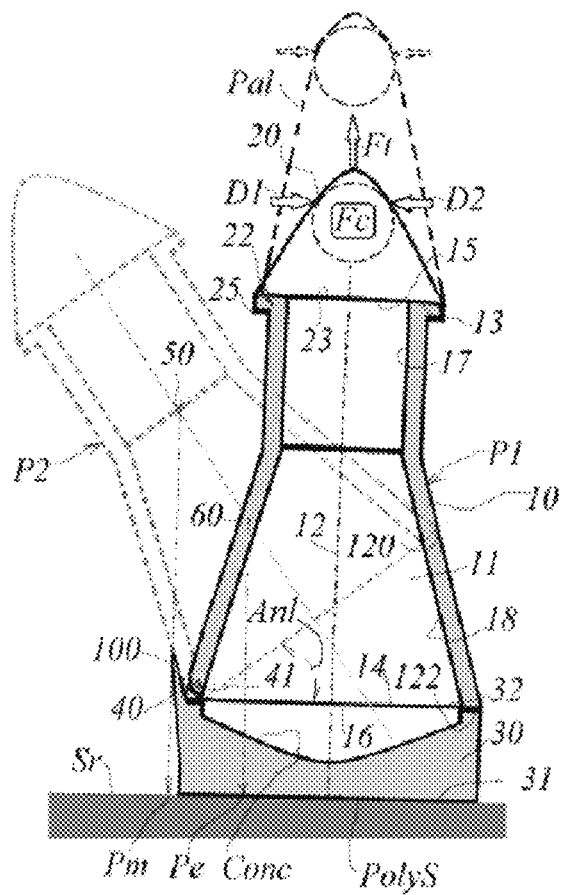
FIG. 1 viewed in longitudinal section, represents an embodiment of the device in accordance with the invention for breaking the shells of nuts, in two possible configurations of this device during use thereof.

Referring to FIG. 1, the device comprises a sleeve 10 comprising a through hole 11 having a longitudinal central axis, the through hole opening onto the first and second ends 13, 14, which are advantageously substantially planar, of the sleeve, respectively via a first orifice 15 and a second orifice 16.

The device also comprises elastic gripping means 20 which are capable of exerting a force in a preferential direction, by means of an operation, which may be manual, for example, and means 22 for coupling these elastic gripping means 20 with the first end 13 of the sleeve in a manner such that this preferential direction is substantially coincident with the longitudinal central axis 12. A preferred exemplary embodiment of these elastic gripping means 20 and of these coupling means 22 will be given below.

The device also comprises a base 30 comprising two opposed faces, a first face 31 which is capable of resting on a reference surface Sr and a second face 32 on which the second end 14 of the sleeve 10 is capable of resting, the second face 32 having a predetermined outline shape such that the second end 14 of the sleeve 10 can rest on it, preferably completely, as illustrated in solid lines in the first figure.

In accordance with an essential feature of the invention, the device furthermore comprises means 40 for rotatably mounting the sleeve 10 with respect to the base 30 about an axis 41 in the vicinity of the base 30 and being substantially perpendicular to the longitudinal central axis 12, in a manner such that the sleeve 10 is capable of taking any position between a first extreme position P1 (in solid lines) in which the plane of the second end 14 of the sleeve rests on the second face 32 of the base 30, and a second extreme position P2 (in broken lines) in which the plane of this second end 14 of the sleeve 10 makes a non-zero angle with the plane of the second face 32 of the base 30.

In accordance with a highly advantageous feature of the invention, the means 40 for rotatably mounting the sleeve 10 with respect to the base 30 about the axis of rotation 41 are disposed in a manner such that when the sleeve 10 is in its second extreme position P2, the plane of its second end 14 makes an angle termed the "limiting angle", Anl, with the plane of the second face 32 of the base 30.

The value of this limiting angle Anl is such that in any position of the sleeve 10 between its two extreme positions P1, P2, the longitudinal central axis 12 always cuts (or intersects) the second face 32 of the base.

The aforementioned limiting angle is also predetermined by the person skilled in the art as a function of the dimensions of the nuts to be smashed, while complying with the aforementioned condition.

In accordance with a further highly advantageous feature of the invention, when the device is capable of being used in a medium in which a gravitational force prevails, the reference surface Sr then being a horizontal surface and the first face 31 of the base 30 in this case constituting the support polygon, PolyS, of the device in a normal position, such as that illustrated in FIG. 1, the mass of the sleeve 10 is determined in a manner such that when the sleeve is in its second extreme position P2, the orthogonal projection Pm of its center of gravity 50 onto the reference surface Sr is located outside the support polygon PolyS.

This structural feature is advantageous because when the device rests on a horizontal surface and the sleeve is in its second extreme position P2, it enables the sleeve to be stable with respect to the base 30 and not to pass automatically into its first extreme position P1 under the influence of this gravitational force, for example.

Furthermore, in order for the device to be stable when the sleeve 10 is in its second extreme position P2 and for the base to rest on a horizontal surface, the total mass of at least the "sleeve-base 10-30" assembly (optionally with the elastic gripping means 20, although in the majority of cases, in particular such as in the preferred embodiment defined below, the mass of these elastic means 20 is negligible compared with the mass of the means 10-30) is determined in a manner such that the orthogonal projection Pe of the center of gravity 60 of this assembly 10-30-20 is located inside the support polygon.

The elastic gripping means 20 may be constituted in different manners. However, highly preferably, they are constituted by a hood produced from an elastic material.

In accordance with a further embodiment, as illustrated in FIG. 1, at least in the relaxed position, this hood has the shape of a hollow cone the major base of which constitutes the opening 23.

In accordance with another embodiment (not shown), in the relaxed position, this hood may have the shape of a cylinder the diameter of which is substantially equal to the section of the first orifice 15.

In accordance with a preferential embodiment of the device, as illustrated in FIG. 1, the through hole 11 has two consecutive portions 17, 18. A first portion 17, that which borders the second orifice 15, is a cylinder of revolution in order to promote centering of the trajectory of the nut on the longitudinal central axis (as will be explained below). The second portion 18 is in the shape of a truncated cone the minor base of which coincides with the cross section of the first portion in the shape of a cylinder of revolution.

Preferably, for aesthetic reasons and for ease of manufacture, the outline shape of the second face 32 of the base 30 is substantially identical to that of the second end 14 of the sleeve 10. In addition, in particular in order to facilitate the recovery of nuts freed from their shell, at least the central portion of the second face 32 of the base, or even the entirety of this second face, is concave in shape, ConC.

Highly preferentially, the second extreme position P2 of the sleeve 10 with respect to the base 30 is defined by abutment means which have the reference numeral 100 in the embodiment illustrated in FIG. 1.

These abutment means may be produced in a number of ways. As an example, as illustrated, they are constituted by a projecting portion of the base (producing a projecting portion on the sleeve is also possible). But they may be constituted by other means, for example a solid, preferably flexible linkage which connects two points, which differ from the axis of rotation, respectively of the sleeve and of the base. These abutment means 100 can be used to define the maximum value of the aforementioned limiting angle Anl in order to produce the function defined above in which, irrespective of the position of the sleeve between these two extreme positions P1, P2, the longitudinal central axis 12 always passes through the second face 32 of the base 30.

In accordance with one possible embodiment, like that illustrated in FIG. 1 by way of example, when they are constituted by a hood of elastic material, the means 22 for coupling the elastic gripping means 20, with the first end 13 of the sleeve 10 are constituted by a laterally protruding rim 25 of this first end of the sleeve onto which the edge of the opening 23 of the hood 20 can be snap fitted by elastically deforming it around the edge.

The sleeve 10 and the base 30 may be produced from any solid material, in turned wood, in molded plastic, etc., and the hood may be produced as a skin formed from an elastic material such as rubber or the like.

Figure 2:
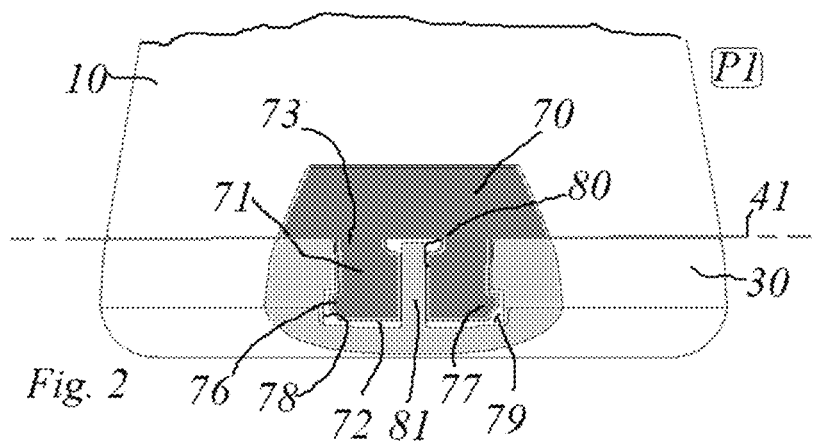
FIGS. 2 to 4 represent another very advantageous embodiment of a part of the device illustrated in its entirety in FIG. 1, this portion relating to the means for rotation of the elements with respect to each other with respective references 10 and 30 in FIG. 1, FIG. 2 being a side view of this portion, and FIGS. 3 and 4 respectively representing two axial sections of this portion in two possible configurations of the device.
Figure 3:
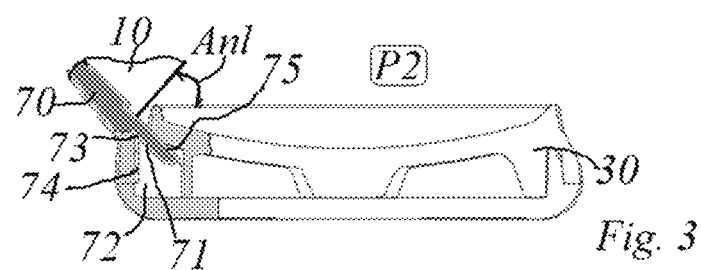
Figure 4:
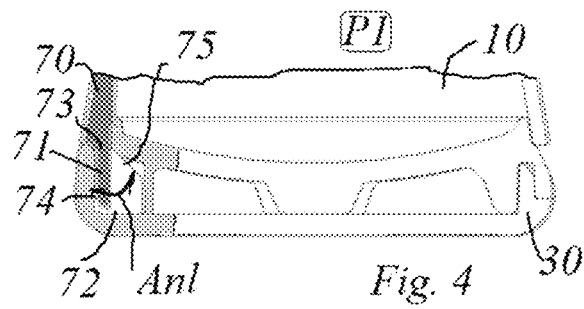

FIGS. 2 to 4 show, in part, a highly preferential and advantageous embodiment of the means 40 for rotatably mounting the sleeve 10 with respect to the base 30 about the axis of rotation 41 which is substantially perpendicular to the central longitudinal axis 12.

These means comprise a tab 70, means for securing the tab 70 to one, 10, termed the "first element", of the two elements of the "sleeve-base" assembly 10-30 in a manner such that a portion 71 of this tab 70 protrudes over this first element, and an open cavity 72 produced in the other element 30, termed the "second element", of the "sleeve-base" assembly.

The cavity comprises an opening 73 having a section which is substantially complementary to the cross section of the tab portion 71 such that this tab portion is capable of being pushed into the cavity 72 by passing it through the opening 73.

In accordance with this embodiment, the opening 73, the tab 70 and the part of the tab portion 71 which is at the level of this opening can produce the axis of rotation 41 (FIGS. 1 and 2) mentioned above.

In fact, the wall of the opening 73 constitutes a bearing on which the tab 70 rests and which can then pivot with respect to the base 30 about a pivotal axis which is in the plane of this opening 73, guided in its pivoting movement by the tab portion 71 which is inserted into the cavity 72. Because this opening is oblong in shape in a direction which is substantially perpendicular to the central longitudinal axis 12, for this reason, this pivotal axis of the tab 70 and its portion 71 constitutes the axis 41 defined above.

Furthermore, the shape of the cavity is such that it has two opposed faces 74, 75 defining a portion of a dihedron limited by a straight line parallel to the axis of rotation 41, the angle of this dihedron formed by the two opposed faces 74, 75 having a value equal to the value for the limiting angle Anl defined above, the minor base of this dihedron being formed by the opening 73.

It should be noted that in the embodiment in accordance with FIGS. 2 to 4, the abutment 100 is constituted by one, 75, of the two opposed faces of the cavity. This face has the same function as the abutment 100 illustrated in FIG. 1, but has an advantage over that of FIG. 1, namely great reliability over time; that of FIG. 1 does not have this because it can easily be broken.

Regarding the other face 74 of the cavity 72, this defines the first position P1 of the sleeve 10 with respect to the base 30 when the two faces 14 and 32 defined above are coincident; see the solid lines in FIG. 1, and FIG. 4.

In accordance with a highly advantageous feature of the invention, the device furthermore comprises means for maintaining the free end of the tab portion 71 in the cavity 72 without preventing pivoting thereof between its two positions defined by the two opposed faces 74, 75.

In accordance with a highly preferential embodiment, these means for maintaining the free end of the tab portion in the cavity are constituted by the fact that the width of the tab is substantially equal to the length of the opening 73, and by the fact that the tab portion 71 furthermore comprises at least one lug 76, 77 (preferably two, opposite each other on either side of the tab portion 71, FIG. 2) substantially in the form of a spur, integral with and protruding from the section of this tab portion 71, and a groove 78, 79 in the form of a circular arc produced in the wall of the cavity 72 in a manner such that the lug 76, 77 is capable of running through it when the tab portion 71 pivots in the cavity at the level of the opening 73.

Highly advantageously, means for guiding the introduction of the tab portion 71 into the cavity 72 may be provided, for example comprising at least one cut-out 80 produced in the tab portion 71 in a plane which is substantially perpendicular to the axis of rotation 41, and a plate 81 which is securely mounted with the second element 30 in the cavity 72, this plate having a cross section which is substantially complementary to that of the cut-out 80 such that this cut-out goes over the plate 81 when the tab portion 71 is pushed into the cavity 72. The device described above functions as follows:

If, for example, a user wishes to break the shell of a hazelnut Fc, first of all, he positions the device in its configuration illustrated in broken lines, in a manner such that the sleeve 10 is in its second extreme position P2. Because of the structure of the device as defined above, the sleeve 10 is capable of staying permanently in this position if the base 30 is in a horizontal plane, which is the most probable case.

The user then places the hazelnut in the concave portion ConC of the face 32 of the base 30, then positions the sleeve 10 such that it takes up its first extreme position P1 and upturns the device, for example manually, in a manner such that the base is at a level which is higher than that of the hood 20. For this reason, under the effect of the force of gravity, the hazelnut Fc falls into the bottom of the hood.

As an example, with two digits D1, D2 of one hand, i.e. The thumb and the index finger, he squeezes the hazelnut and an interposed portion of the wall of the hood 20. Holding the sleeve and the base with the other hand, he upturns the device and exerts a pulling force Ft on the hood with respect to the sleeve 10 (broken lines) in order to deform the hood elastically by extending it, Pal, while continuing to squeeze the hazelnut. When the hood has been fully tensed, he can release it, along with the hazelnut. Under the action of the elastic force of contraction of the hood, which regains its original shape, the hazelnut Fc is violently projected onto the face 32 of the base 30, on which its shell shatters. By returning the sleeve 10 to its position P2 and by passing his hand into the space created between the edge 120 of the sleeve and the edge 122 of the base, he can remove the hazelnut from its shell. To get rid of the shell debris, it is then sufficient to incline the device in order to allow the debris to fall out, for example into his hand or into a cup.

The structure of the device in accordance with the invention is particularly advantageous, in particular as regards safety. In fact, because the longitudinal central axis 12 always cuts or intersects the face 32 of the base irrespective of the position of the sleeve with respect to the base, the hazelnut will always strike this face 32. It is not possible for it to be projected into the surrounding medium in the manner of a projectile which could cause an accident such as an injury to a person.

The invention claimed is:

1. A device for breaking the shells of nuts, comprising:
   a sleeve comprising a through hole having a longitudinal central axis, said through hole opening onto first and second ends of the sleeve respectively via a first orifice and a second orifice;
   an elastic gripper configured to exert a force in a preferential direction;
   a coupling that couples said elastic gripper with the first end of the sleeve in a manner such that said preferential direction is substantially coincident with said longitudinal central axis;
   a base comprising two opposed faces, a first face which is capable of resting on a reference surface and a second face on which the second end of the sleeve is capable of resting, said second face having an outline shape on which the second end of the sleeve can rest; and
   means for rotatably mounting said sleeve with respect to said base about an axis of rotation which is substantially perpendicular to said longitudinal central axis, in a manner such that said sleeve is capable of taking any position between a first extreme position in which a plane of the second end of the sleeve rests on the second face of said base, and a second extreme position in which the plane of the second end of the sleeve makes a non-zero angle with the plane of the second face of said base,
   wherein the means for rotatably mounting said sleeve with respect to said base about said axis of rotation are disposed in a manner such that when the sleeve is in the second extreme position, the plane of the second end makes a limiting angle with a plane of the second face of the base with a value such that, in any position of the sleeve between the first and second extreme positions, the longitudinal central axis always intersects the second face of the base, and
   wherein said second extreme position of the sleeve with respect to the base is defined by abutment means.

2. The device as claimed in claim 1 wherein, when said device is capable of being used in a medium in which a gravitational force prevails, a reference surface then being a horizontal surface and the first face of said base constituting the support polygon of said device, the mass of the sleeve is determined in a manner such that when the sleeve is in the second extreme position, an orthogonal projection of a center of gravity of the device onto said reference surface is located outside said support polygon.

3. The device as claimed in claim 2, wherein the total mass of an assembly of the sleeve and the base is determined in a manner such that an orthogonal projection of the center of gravity of said assembly is located inside said support polygon irrespective of a position of the sleeve with respect to the base between said first and second extreme positions.

4. The device as claimed in claim 1, wherein the means for rotatably mounting said sleeve with respect to said base about said axis of rotation which is substantially perpendicular to said longitudinal central axis comprise:
   a tab,
   means for securing the tab to a first of the sleeve and the base in a manner such that a portion of the tab protrudes over said first element,
   an open cavity produced in a second of the sleeve and the base, said cavity comprising an opening having a section which is substantially complementary to the cross section of said tab portion in a manner such that said tab portion is capable of being pushed into the cavity by passing through said opening, the cavity furthermore being shaped in order to present two opposed faces defining a portion of a dihedron limited by a straight line parallel to said axis of rotation, an angle of the dihedron formed by the two opposed faces having a value equal to said value for said limited angle, and a minor base of the dihedron being formed by said opening.

5. The device as claimed in claim 4, comprising means for holding a free end of said tab portion in said cavity without preventing pivoting therein between two positions defined by the two opposed faces.

6. The device as claimed in claim 5, wherein the width of said tab is substantially equal to a length of said opening, wherein said tab portion comprises at least one lug which is substantially shaped as a spur which is integral with and protrudes from the section of said tab portion, and said cavity comprises a groove formed as a circular arc produced in a wall in a manner such that said lug is capable of running over the arc when said tab portion pivots in said cavity at the level of said opening between the two opposed faces.

7. The device as claimed in claim 4, comprising means for guiding said tab portion into said cavity.

8. The device as claimed in claim 7, wherein the means for guiding the tab portion into the cavity comprise at least:
   a cut-out produced in said tab portion in a plane which is substantially perpendicular to the axis of rotation, and
   a plate which is securely mounted in said cavity, the plate having a cross section which is substantially complementary to that of said cut-out, such that said cut-out goes over said plate when the tab portion is pushed into said cavity.

9. The device as claimed in claim 1, wherein the elastic gripper constituted by a hood produced from an elastic material which, in the relaxed position, has the shape of a cylinder the diameter of which is substantially equal to the section of the first orifice.

* * * * *